United States Patent

(12) United States Patent
Tew

(10) Patent No.: US 6,559,935 B1
(45) Date of Patent: May 6, 2003

(54) SENSORS OF RELATIVE POSITION AND ORIENTATION

(75) Inventor: Anthony Ivor Tew, Yorkshire (GB)

(73) Assignee: University of York, Yorkshire (GB)

( * ) Notice: Subject to any disclaimer, the term of this patent is extended or adjusted under 35 U.S.C. 154(b) by 0 days.

(21) Appl. No.: 09/937,544

(22) PCT Filed: Mar. 24, 2000

(86) PCT No.: PCT/GB00/01018

§ 371 (c)(1),
(2), (4) Date: Nov. 15, 2001

(87) PCT Pub. No.: WO00/58751

PCT Pub. Date: Oct. 5, 2000

(30) Foreign Application Priority Data

Mar. 25, 1999 (GB) .............................................. 9906796

(51) Int. Cl.[7] .......................... G01C 1/00; G01B 11/26; G01S 3/80; G01S 1/00; G01S 5/04
(52) U.S. Cl. .................. 356/139.03; 342/385; 342/432; 367/124; 367/126; 356/141.5; 356/152.1
(58) Field of Search .................. 356/139.03, 141.5, 356/152.1; 342/385, 432; 367/124, 126

(56) References Cited

U.S. PATENT DOCUMENTS 3,678,283 A * 7/1972 Labaw
3,698,816 A * 10/1972 Lutchansky
3,866,229 A * 2/1975 Hammack
4,742,356 A * 5/1988 Kuipers
4,964,722 A * 10/1990 Schumacher

FOREIGN PATENT DOCUMENTS

WO         9519577    * 7/1995
WO     WO 96/35960      11/1996

OTHER PUBLICATIONS

D. Kim et al, "An Optical Tracker for Augmented Reality and Wearable Computers", Proc. IEEE 1997 Annual Intl. Symposium on Virtual Reality, Mar. 1–5, 1997, Cat. No. 97CB36033.*

A. Cameron et al, "Helme Trackers—The Future", Helmet and Head–Mounted Displays and Symbology Design Req. II; Orlando, Fl Apr. 18–19, 1995, vol. 2465, p. 281–295, XP 000920963.*

* cited by examiner

*Primary Examiner*—Stephen C. Buczinski
(74) *Attorney, Agent, or Firm*—Smith-Hill and Bedell

(57) ABSTRACT

An optical position and orientation determining system determines yaw, pitch, roll, lateral translation and longitudinal translation of a body with respect to a direction and intensity sensing receiver. The system comprises two energy beam emitters, mechanically mounted on a body, which illuminate the position sensing receiver. The energy beams are intermittently energized in a predefined fashion to enable the receiver and its associated signal porcessing means to determine the position and orientation of the body with respect to the receiver. The system can also be used to determine velocities and accelerations of the body relative to the receiver.

26 Claims, 4 Drawing Sheets

SENSORS OF RELATIVE POSITION AND ORIENTATION

This invention relates to the determination of position and orientation for a mechanical structure relative to a proximal point in space. Preferred embodiments of the invention determine the co-ordinates of the human head when an individual is seated. This information enables head and torso movements of the individual to form part of his/her interaction with software being executed by a computer (Browse R A, Rodger J C, Sewell I and Brooke J: *"Controlling graphic objects naturally: use your head": Proc. S.P.I.E. Int. Soc. for Optical Engineering,* 3012, 448–53, 1997).

A variety of methods have been described for the determination of position and/or orientation of a rigid body. Typically these are based upon the use of optics, ultrasound [U.S. Pat. Nos. 4,682,159, 5,761,155, 5,495,427], mechanical linkages [U.S. Pat. No. 5,452,516], accelerometry [U.S. Pat. No. 5,615,132] and electromagnetism [U.S. Pat. Nos. 5,747,996, 4,622,644, 3,983,474]. To achieve satisfactory performance, or to correct for the drift associated with some methods, two or more methods may be combined [U.S. Pat. Nos. 5,645,077, 5,592,401]. For a review of helmet mounted head tracker technology, see Cameron A A, Trythall S and Barton A: *"Helmet trackers—the future": Proc. S.P.I.E. Int. Soc. for Optical Engineering,* 2465, 281–95, 1995.

A preferred embodiment of the present invention is optical, but the invention need not be restricted to this form of embodiment. Most prior systems have used at least three modulated light (or infra-red) sources and one [for example, U.S. Pat. No. 5,059,789, and Kim D, Richards S W and Caudell T P: *"An optical tracker for augmented reality and wearable computers": Proc. I.E.E.E.* 1997 Virtual Reality Ann. Int. Symp., Cat. 97CB36033, 146–50, 1997], or two [U.S. Pat. Nos. 5,717,201, 4,649,504] position detectors. The phenomenon of light diffraction has also been employed [U.S. Pat. No. 5,726,758]. In practice, more than three sources may be needed in an actual implementation based on triangulation principles. Prior sensor systems are typically capable of high accuracy [U.S. Pat. Nos. 5,452,516, 5,388,059] and of determining position and orientation of the rigid body in all six degrees of freedom [U.S. Pat. Nos. 5,059,789, 4,672,562, 4,649,504] but may need considerable pixel-based image processing [U.S. Pat. Nos. 5,608,528, 5,424,556, 5,353,042, 5,187,540].

A two-source system has previously been devised [U.S. Pat. No. 4,888,490], which projects two focused laser beams onto a uniform surface to determine the proximity and orientation of the surface with 4 degrees of freedom (orientation and proximity) relative to the laser sources. Retro-reflection from two pairs of co-incident sources and directional detectors have been described for computing positional information of passive reflectors based on directional information (U.S. Pat. No. 4,576,481). In another two-source device, a single photoquadrant detector is used to determine source directions, but not their intensity [U.S. Pat. No. 5,694,153]. Preferred embodiments of two other schemes [U.S. Pat. No. 5,510,893, UK Patent No GB 2 289 756 B or U.S. Pat. No. 5,627,565] may employ two sources and one photoquadrant-like detector. Again, however, the intensity of the sources is not exploited in the determination of relative position.

Preferred embodiments of the present invention aim to determine the co-ordinates of a moveable body, with up to 5 degrees of freedom, using only two diffuse light sources mounted on the moveable body. This is achieved by a combination of determining the direction of the sources, measuring the individual intensities of the sources and comparing their relative intensities.

According to one aspect of the present invention, there is provided a sensor of relative position and orientation, comprising:

a. first and second emitters which are mutually spaced by a predetermined distance and are arranged respectively to emit first and second electromagnetic radiation in respective first and second directions which have a mutual angular spacing of a predetermined angle; and b. a receiver arranged to receive the electromagnetic radiation emitted by both of said emitters and to output:
  i. a first signal dependent upon the total intensity of said first electromagnetic radiation as received by said receiver;
  ii. a second signal dependent upon the total intensity of said second electromagnetic radiation as received by said receiver;
  iii. a third signal dependent upon the direction of said first emitter relative to said receiver; and
  iv. a fourth signal dependent upon the direction of said second emitter relative to said receiver:

the sensor further comprising:

c. signal processing means arranged to receive from the receiver said first, second, third and fourth signals and to derive therefrom, utilising a ratio of said first and second signals, an output signal indicating both the position of said emitters relative to said receiver and the orientation of said emitters relative to said receiver.

Preferably, said predetermined angle is other than 0°.

Preferably, said electromagnetic radiation is infra-red radiation.

Preferably, said receiver comprises a lens, an optical bandpass filter, an aperture and a detector.

Preferably, said receiver comprises a photoquadrant detector.

Said emitters may be mounted on a headset.

Said receiver may be mounted on a headset.

Said predetermined distance may be a fixed predetermined distance.

Said predetermined distance may be capable of limited variation.

Preferably, said receiver is fixed relative to world co-ordinates and said emitters are free to move.

Said emitters may be fixed relative to world co-ordinates and said receiver free to move.

Preferably, each of said emitters is arranged to emit its respective said electromagnetic radiation in such a pattern that contours of constant ratio of respective total intensities of said radiation at said receiver are orthogonal or near-orthogonal to contours of constant angular separation of said emitters subtended at said receiver.

Each of said emitters may be arranged to emit its respective said electromagnetic radiation in such a pattern that ratios of respective total intensities of said radiation at said receiver are substantially dependent upon the yaw of an imaginary line passing close to the optical centres of said emitters relative to said receiver.

Each of said emitters may be arranged to emit its respective said electromagnetic radiation in such a pattern that ratios of respective total intensities of said radiation at said receiver are substantially independent of the distance between said emitters and said receiver.

Each of said emitters may be arranged to emit its respective said electromagnetic radiation in such a pattern that ratios of respective total intensities of said radiation at said receiver are substantially independent of the rotation of said emitters about an imaginary line passing close to the optical centres of said emitters relative to said receiver.

Preferably, the radiation patterns of said emitters are oriented in different directions relative to each other.

Said position of said emitters relative to said receiver and said orientation of said emitters relative to said receiver may be determinable in respect of one or more or all of the following: lateral translation, longitudinal translation, yaw, pitch and roll.

Said position of said emitters relative to said receiver and said orientation of said emitters relative to said receiver may be determinable in respect of one or more or all of the following: lateral translation, vertical translation, longitudinal translation, yaw and pitch.

Said position of said emitters relative to said receiver and said orientation of said emitters relative to said receiver may be determinable in respect of one or more or all of the following: lateral translation, vertical translation, longitudinal translation, yaw, pitch and a mixture of vertical translation and pitch.

Preferably, said first and second electromagnetic radiation is coded by a pseudo-random code, or other near-orthogonal or orthogonal code, to allow independent, or near-independent, reception of said first and second electromagnetic radiation by said receiver.

Preferably, said first and second electromagnetic radiation is coded by a code that allows multiple further said emitters to be added and their respective radiations to be independently received by said receiver.

A sensor as above may further comprise one or more additional said emitter and/or one or more additional said receiver, to provide one or more further signal to said signal processing means to derive therefrom said output signal.

Said output signal may indicate both position and orientation with up to six degrees of freedom.

A sensor as above may further comprise a computational model of the physical sensor system which is used by said signal processing means for the determination of one or more co-ordinates estimated by said signal processing means from the signals received from said receiver.

A sensor as above may be adapted as an input device for a computer, to control operation of the computer.

The invention extends to a computer provided with a sensor according to any of the preceding aspects of the invention, arranged as an input device to control operation of the computer.

For a better understanding of the invention, and to show how embodiments of the same may be carried into effect, reference will now be made, by way of example, to the accompanying diagrammatic drawings, in which.

In the figures, like reference numerals denote like or corresponding parts.

A basic embodiment of the invention need consist of (a) no more than two emitting means, of approximately known separation and relative orientation; and (b) no more than one receiving means, independently mounted, but within the irradiated volume of the combined emitting means. The directions, typically expressed as a set of orthogonal components, and the individual detected intensities of the emitting means are measured by the receiving means. Extra emitting means and/or receiving means may be added, for example, to provide greater accuracy or to extend the system to detect movement with 6 degrees of freedom, or to increase the number of bodies whose co-ordinates may be estimated, but these embellishments do not substantially affect the underlying principle of operation of the invention. Embodiments of the invention also include processing means both for controlling emissions and for interpreting the signals from the receiving means to provide an indication of position and orientation of the emitting means relative to the receiving means. Typically, this may include the determination of the direction of each emitting means from the receiving means, in a conventional manner. Other operations performed by the processing means include the comparison of the detected total intensities of each emitting means and the calculation of the ratio of the detected total intensities between one (or more) pairs of emitting means. ("Total" intensity means the total intensity for a respective emitting means and, in the case, of a photoquadrant detector, for example, means the sum of the intensities on all 4 quadrants, rather than the normalised differences between the detected total intensities of opposing pairs of quadrants, as is used conventionally for indicating direction.) These operations may be used to provide information about the position and orientation of an imaginary line passing close to the optical centres of each pair of emitting means, relative to the receiving means.

Figure 1:
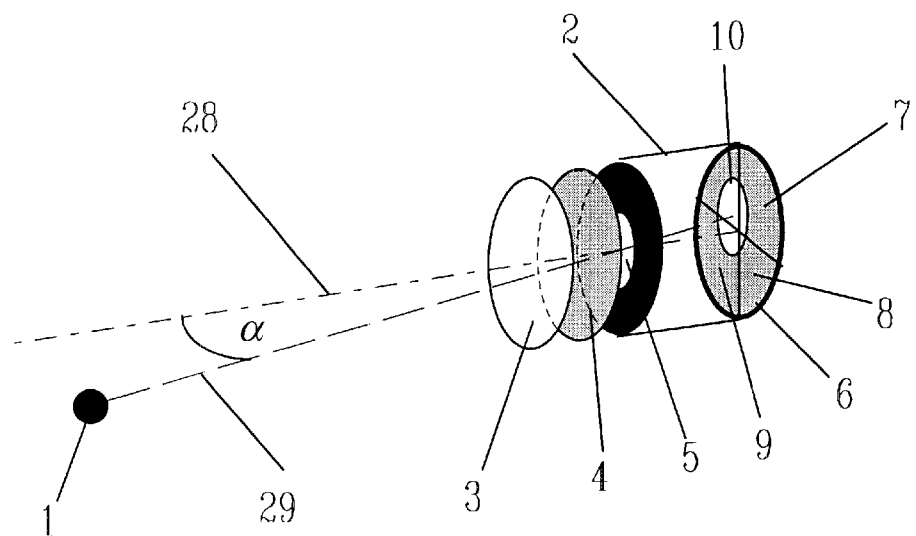
FIG. 1 illustrates the principle of operation of a receiver with a photoquadrant detector to detect light from a source.
Figure 2:
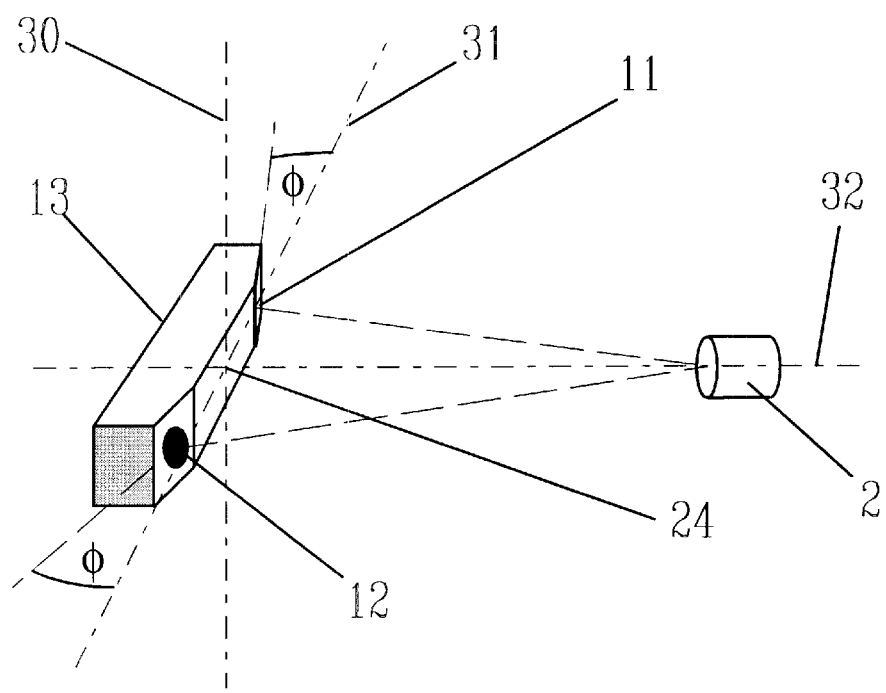
FIG. 2 illustrates a receiver to detect light from two sources on a common body.

To explain the essential technical features of a basic embodiment of the invention, the reader is referred to FIGS. 1 and 2. A photoquadrant detector 6 forms the underlying basis of detector operation in the illustrated optical arrangement (FIG. 1), although alternative photodetection devices could be used, such as one-dimensional or two-dimensional position sensing devices, or pixel-based imaging technologies. The skilled reader will be familiar with the general mode of operation of photoquadrant detectors and the other above-mentioned photodetection devices.

Electromagnetic radiation (normally, but not necessarily, infra-red), hereinafter referred to as light for convenience, is emitted from a source 1 and permeates the volume of operation. The receiver 2 is a position and intensity sensor and typically consists of a lens 3, an optical bandpass filter 4, an aperture 5 and the photoquadrant detector 6. Normally, the receiver 2 may be situated anywhere within the irradiated volume, provided that there is sufficient luminous intensity falling on the photosensitive surfaces of the detector for a signal to be detected and provided that all four quadrants are at least partially illuminated. An axis of symmetry 28 of the receiver 2 subtends some restricted angle $\alpha$ with the line 29 connecting the source 1 and the aperture 5. Light passes through the aperture 5 and falls on the light sensitive surface of the photoquadrant detector 6. It is possible to determine the direction of the source from the detector by measuring the relative intensity of light falling on each of the quadrants 7, 8, 9 and 10. The intensity of light falling on the detector surface due to a source depends on, amongst other things, the distance of the source from the detector and may depend on its orientation relative to the detector. Although a round aperture 5 is shown in FIG. 1, it may conveniently be some other shape, such as square or gradated (Tew A I: *"The Oxford Optical Pointer: a direction-sensing device with proportional electrical output"*: Medical & Biological Engineering & Computing, 26, 68–74, 1988).

Typically, two emitters or sources 11 and 12, as shown in FIG. 2, are mounted on a common body 13 and have longitudinal axes of symmetry which are non-parallel, being divergent (or convergent) by some angle φ relative to a forward face 24 of the body 13. The body need not be rigid, provided that the spacing and the directions of the sources 11 and 12 relative to each other are at least approximately known whilst the embodiment is operating. Decreasing the accuracy with which these parameters are known predominantly introduces errors of scale in estimates of the co-ordinates of the body 13, but does not negate the underlying principle of operation. Accordingly, the term "predetermined" as used in this specification is to be construed accordingly to allow some latitude to the extent to which the or each distance by which the two (or more) emitters (such as 11 and 12, for example) are mutually spaced is predetermined; and the extent to which the or each angle by which the respective directions of emission from the two (or more) emitters are mutually angularly spaced is predetermined. Those skilled in the art will readily understand that, as outlined above, tolerance in the predetermination of such distances and angles will simply result in a consequent tolerance in the overall determination of relative position and orientation.

The longitudinal axes of symmetry of the two emitters 11 and 12 may alternatively be parallel, i.e. such that the angle φ is zero, but better results may be expected if the angle φ is other than zero, such that the axes of symmetry diverge or converge.

In one embodiment, the receiver 2 is fixed relative to its surroundings and the body 13 is free to move, subject to the limitation that the direction and distance of the sources 11,12 relative to the receiver 2 satisfy conditions for correct operation. Measurements are made of the directions and relative detected total intensities of the sources 11 and 12 from the receiver 2. That is, relative intensities are measured in the respective quadrants of the photoquadrant detector 6 to determine the directions of the sources 11 and 12 from the detector in a more or less conventional manner, as outlined above. In addition to this, the total detected light intensity landing on all of the detector 6 is sensed for each of the sources 11 and 12 individually, and the ratio of those total intensities measured. The position and orientation of the receiver 2 relative to the body 13 (including a mixture of vertical translation and pitch) can then be determined by appropriate signal processing. In an alternative embodiment, the body 13 is fixed and the receiver 2 is free to move within the common volume irradiated by both of the sources 11 and 12. In a yet further embodiment, both the body 13 and the receiver 2 are free to move, and the position of either component may be expressed relative to the other.

The radiation patterns of the two sources 11 and 12 play a role in the operation of this device. It is desirable, but not essential, that the ratio of the detected total intensities of the two sources 11 and 12 is, under normal conditions of operation, an easily linearised function of orientation for the body 13 about the axis described by line 30 with respect to the receiver 2. It is also desirable, but not essential, that the ratio of the detected total intensities of the two sources 11 and 12 is, under normal conditions of operation, practically independent of distance of the body 13 from the receiver 2. It is also desirable, but not essential, that the ratio of the detected intensities of the two sources 11 and 12 is, under normal conditions of operation, practically independent of rotation of the body 13 about its axis described by line 31. In practice, a plurality of radiation patterns exist which exhibit one or more of these desirable characteristics.

Figure 3:
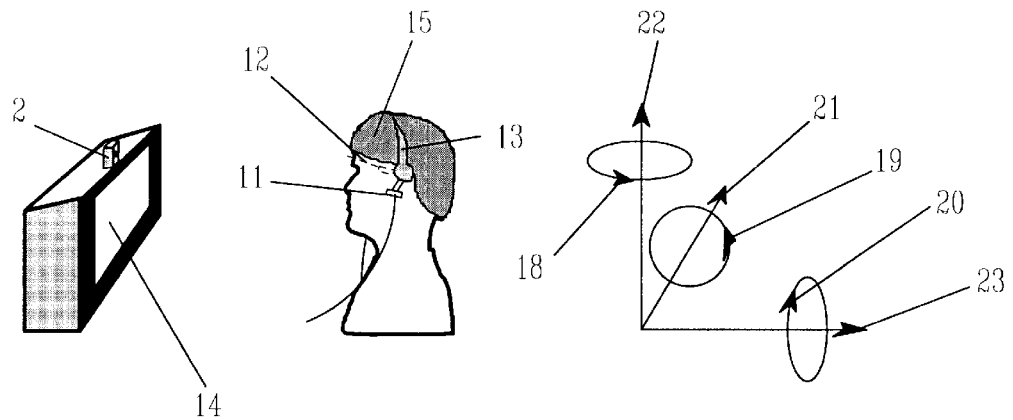
FIG. 3 illustrates one example of an embodiment of the invention, using a single receiver to detect light from two sources, as outlined in FIG. 2.
Figure 4:
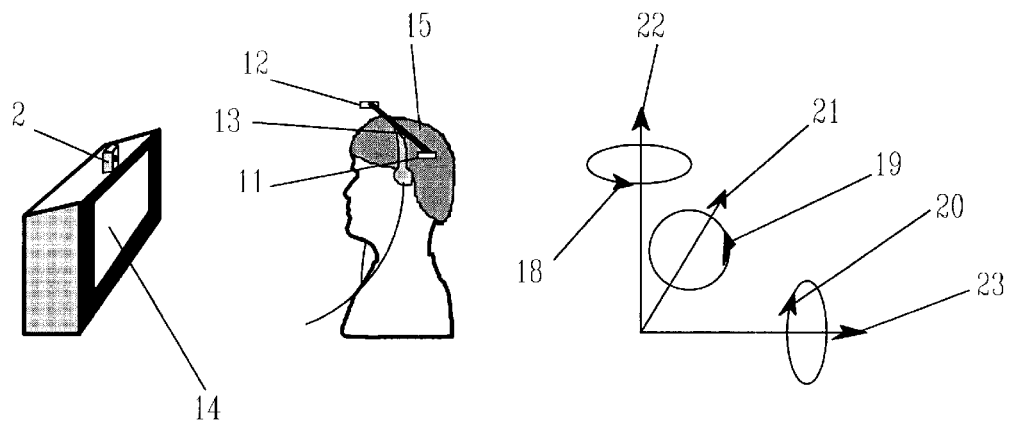
FIG. 4 is an illustration similar to FIG. 3, but showing an alternative example of an embodiment of the invention.

Two practical implementations of the invention are shown in FIGS. 3 and 4. They relate to the determination of head position (lateral translation 21, longitudinal translation 23) and orientation (yaw 18, pitch 19 and roll 20) of an individual seated in front of a computer display. As such, these specific embodiments require neither high accuracy nor detection of vertical translation movements 22. Both of the embodiments are similar, except that, in FIG. 4, the body 13 is rigid, whilst in FIG. 3, separation of the sources 11 and 12 may vary according to the size of the head. Without calibration, variability in the separation of the sources 11,12 may introduce errors of scale (i.e. there will be some latitude in the predetermination of the distance between the sources 11 and 12), but means may be provided for calibrating the device to accommodate such variability.

With reference to either FIG. 3 or FIG. 4, the receiver 2 is placed close to a computer display 14, and the body 13 is stably mounted on the user's head 15 in such a position that, during normal use, there is an unobstructed optical path between source 11 and the receiver 2, and source 12 (obscured by the head in FIG. 3, but symmetrically opposed to 11) and the receiver 2. When executing a suitable piece of software, a wide range of head movements may be used to interact with the computer and hence to control the program. In a typical embodiment, and once the user is comfortably seated, only small vertical translations 22 of the head may be expected. Such vertical translations 22 and pitch rotations 19 of the head as do occur may be attributed to pitch rotations 19 alone, vertical translations 22 alone or a mixture of the two, as most appropriate in a particular application.

Steps may be taken to reduce interference between the computer display 14 and the receiver 2. In a preferred embodiment, this entails the use of (near-)orthogonal pseudo-random binary sequences to control the illumination of the sources 11 and 12. The intensity of illumination falling on each quadrant from a particular source may be determined by using the same pseudo-random binary sequence to phase-synchronously detect the received signals. The positions of illuminated spots falling on the detector 6 from the sources 11 and 12 can thus be independently computed. To this pair of binary sequences may be added further binary sequences, all mutually near-orthogonal. These may, for example, be used to accommodate a plurality of users, each with their own pair of sources and all using the same receiver 2. Other ways of achieving individual measurements of spot positions are well known to those skilled in the art and may include the use of electromagnetic radiation of different wavelengths or polarisations, modulation of the sources using different frequencies, or using another form of orthogonal or near-orthogonal signal encoding.

Figure 5:
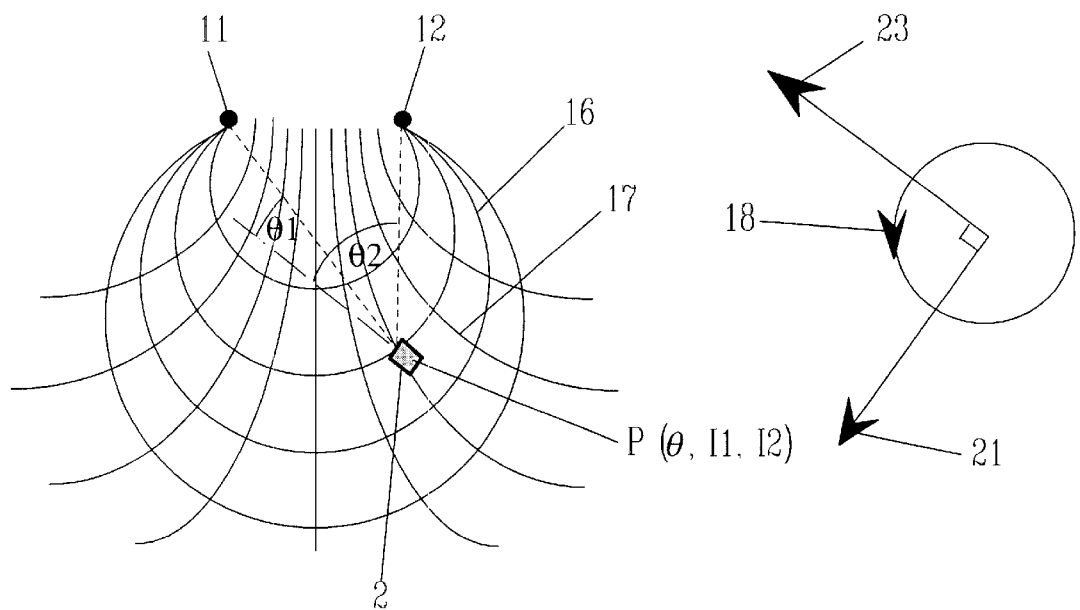
FIG. 5 illustrates contours of constant angular separation and contours of constant total intensity ratio of two light sources.

With a knowledge of the position and total intensity of each spot on the detector 6, it is possible to compute the position and orientation of the body 13 relative to the receiver 2. FIG. 5 depicts contours 16 of constant angular separation of the sources 11 and 12 subtended at the receiver 2 and contours 17 of constant total intensity ratio of the sources 11 and 12 as observed from the receiver 2. For simplicity we shall assume that the sources 11 and 12 radiate isotropically in all forward directions and consider initially the operation of the sensor in the three degrees of freedom most easily describable in the plane of the diagram (yaw 18, lateral translation 21 and longitudinal translation 23). It may be demonstrated that the contours 16 and 17 always intersect orthogonally or approximately orthogonally. Hence, measurement of the directions θ1 and θ2 of the sources 11 and 12 respectively from the receiver 2 and their angular separation (θ=θ2−θ1) and the total intensity ratio (I1/I2) is sufficient information to determine the co-ordinates P (θ, I1, I2) of the receiver 2 with respect to the body 13, or the position and orientation of the body 13 with respect to the receiver 2 for yaw 18, lateral translation 21 and longitudinal translation 23.

Of central importance is the relationship between the intensities I1 and I2 and the yaw of the body 3 with respect to the receiver 2. This may take the generic form:

$$\lambda \alpha (I_1 + I_2)^{-P} \left\{ \log_{10} \left[ \frac{I_1}{I_2} \right] \right\}$$

where the value of P is adjusted to produce optimum linearity in the relationship between the actual yaw and the estimate λ.

Pitch rotations 19 and roll rotations 20 create movements of the body outside the plane shown in FIG. 5. However, with suitable radiation pattern characteristics for the sources 11 and 12, such rotations need not significantly affect the determination of yaw 18, lateral translation 21 and longitudinal translation 23 using the method outlined above.

Figure 6:
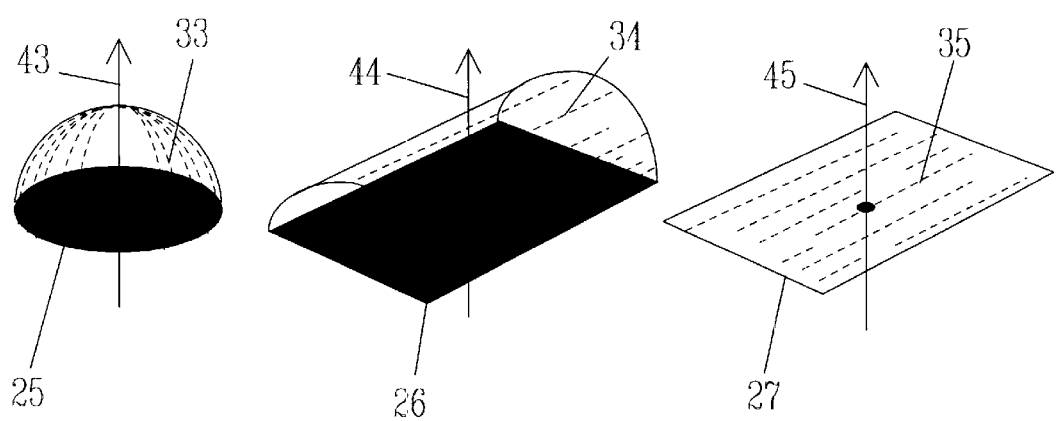
FIG. 6 illustrates three different examples of light sources, with different respective diffusing surfaces.

FIG. 6 shows three typical embodiments of either of the sources 11 and 12. 25 represents an isotropic radiator, with a hemispherical diffusing surface 33. It has the characteristic that its radiation pattern is independent of yaw 18, pitch 19 and roll 20 for all normal variations in these parameters. Although 25 is an isotropic radiator, because it is hemispherical, it has an axis of symmetry 43 which defines a general direction of emission. 26 represents a source with a hemicylindrical diffusing surface 34 and axis of symmetry 44, with the property that its radiation pattern is dependent on yaw 18, but substantially independent of pitch 19 and roll 20. 27 represents a source with a plane diffusing surface 35 and axis of symmetry 45, which has the property that its radiation pattern is dependent upon yaw 18 and pitch 19, but substantially independent of roll 20. When the sources 11 and 12 have a radiation pattern which is non-isotropic, of which 26 and 27 are two possible examples, then the computations compared with the isotropic case are modified, but substantially similar in nature. To illustrate this using FIGS. 3 and 6, imagine the situation when the head, initially directly facing the receiver 2, is rotated slightly in yaw 18. Initially, the ratio of total intensities of the sources 11 and 12 is unity, but will become non-unity as the head is turned. When isotropically radiating sources 25 are assumed for the sources 11 and 12, then the total intensity ratio for some particular angle of yaw is R, say. If the radiation pattern for each source is now changed to that arising from a plane diffuser 27, then the total intensity ratio for the same angle of yaw becomes approximately proportional to $R^2$.

Typically, the determination of co-ordinates will involve the evaluation of appropriate trigonometric expressions and the use of scalar, vector and matrix algebra. Alternative implementations may employ numerical methods, such as those described by Johnson L W and Riess R D ("*Numerical Analysis*": Addison Wesley, Philippines, 1982, 2nd edition) or a form of artificial intelligence, such as the use of an artificial neural network, to perform the bulk of the processing. In all embodiments the purpose is essentially the same; namely, to convert the photoquadrant detector signals into signals more directly expressing the position and orientation of the body 13 with respect to the receiver 2.

Simplification of the necessary processing is achievable by meeting the accuracy requirements of a particular embodiment, but not exceeding them. Conversely, the computations may be enhanced to achieve greater accuracy and reduced uncertainty in the estimates for one or more of the co-ordinates. This approach may be taken to overcome the practical difficulty in accurately determining the separation between the body 13 and the receiver 2 when using a method based purely on triangulation. Triangulation errors are expressed most markedly in the determination of the co-ordinate in the direction of the longitudinal translation 23. A preferred embodiment includes an approximate computational model of the sensor system. This allows an estimate to be made for the light levels falling on each of the quadrants 7, 8, 9 and 10 of the of the photoquadrant detector 6 based on the previously determined position and orientation of the body 13 relative to the receiver 2. Any difference between the total light intensities actually measured by the photoquadrant detector 6 and the total light intensities as calculated using the model is largely attributable to an error in the co-ordinate in the direction of the longitudinal translation 23. The co-ordinate is adjusted according to the inverse square law of radiation intensity so that the actual and modelled intensities become equal. This intensity-based correction to the triangulation method substantially reduces the standard deviation in estimates for the co-ordinate in the direction of the longitudinal translation 23.

Figure 7:
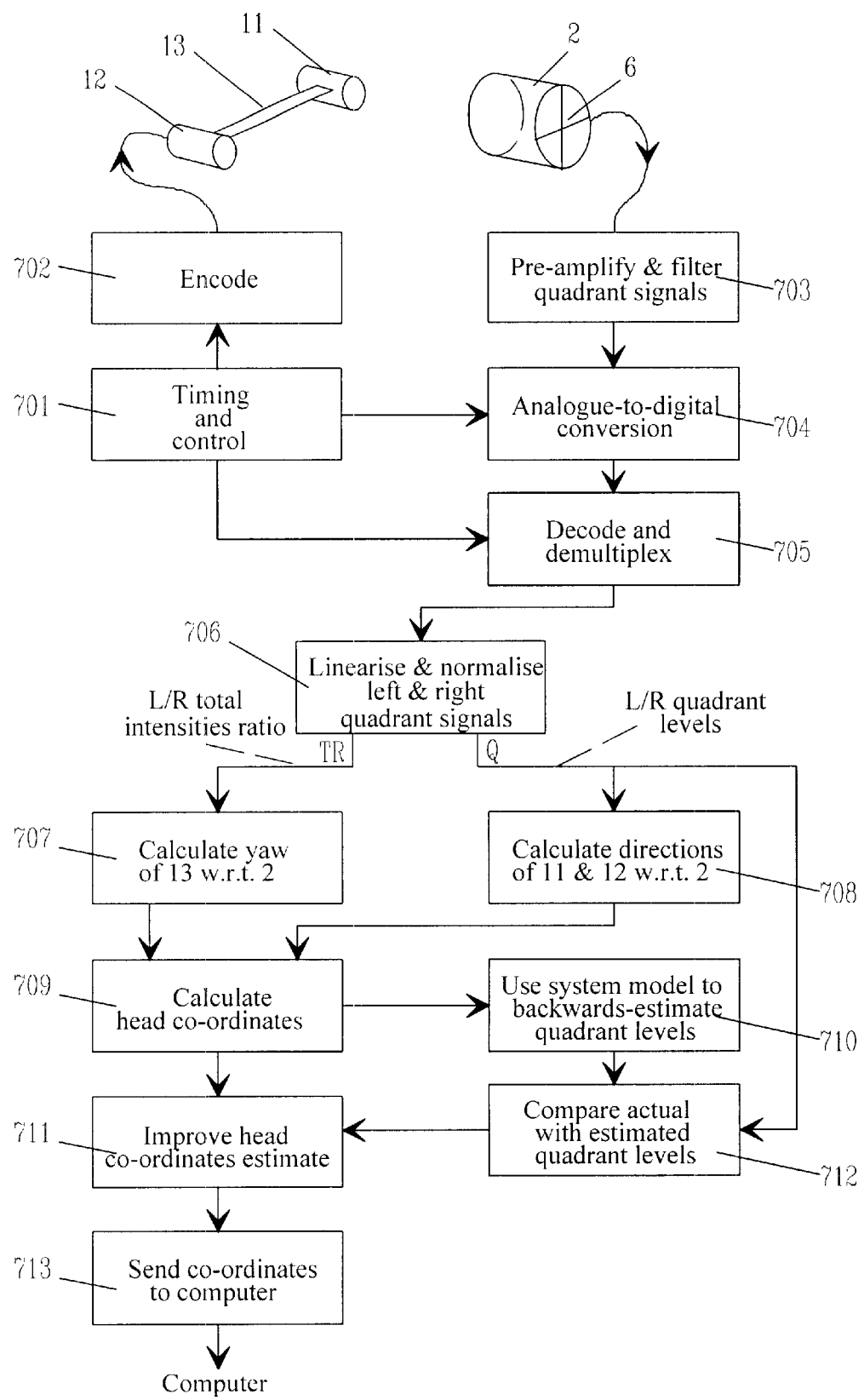

FIG. 7 illustrates a sensor along the lines of that illustrated in FIG. 4, comprising emitters 11 and 12 carried on a common body 13, and arranged to emit to a receiver 2 using a photoquadrant detector 6. For convenience, the emitters 11 and 12 will be referred to as left and right emitters respectively. FIG. 7 illustrates various components 701 to 713 of the overall system, each labelled with the respective function of the component.

Timing and control functions are carried out at component 701, in response to which an encoder 702 is operative to output to the emitters 11 and 12 respective coded signals to be emitted by way of modulation of suitable radiation. In this example, the signals from emitters 11 and 12 are radiated in time division multiplex manner, and the radiated signals are received by the receiver 2 and photoquadrant detector 6, the general mode of operation of which has been outlined above.

At component 703, signals received from the receiver 6 are pre-amplified and filtered, and passed to component 704 where analogue-to-digital conversion is carried out. In component 705, the converted digital signals are decoded and demultiplexed.

In component 706, the quadrant signals from the detector 6 are linearised and normalised for each of the left and right emitters 11 and 12. From these, a first output signal TR is output to component 707, and represents a ratio of the total intensities as received at the detector 6, from the left and right emitters 11 and 12 respectively. A second output signal Q represents the intensity levels as received on individual quadrants of the detector 6, for both the left and right emitters 11 and 12. The signal Q is passed to components 708 and 712.

Component 707 calculates from the received signal TR the yaw of the common body 13 with respect to the detector 2, and outputs a corresponding signal to component 709. Component 708 in the meantime calculates from the output signal Q the directions of the emitters 11 and 12 with respect to the receiver 2, and outputs a corresponding signal to component 709.

From the signals received from components 707 and 708, component 709 calculates the co-ordinates of the body 13, and subsequently the approximate co-ordinates of the head. Component 709 provides a corresponding output signal to both components 710 and 711. Component 710 contains stored parameters of a computational model of the overall system and, from the co-ordinate values received from component 709, estimates the corresponding expected levels of the quadrant signal Q. In component 712, these estimated levels are compared with the actual measured levels, and a correction signal is fed to component 711. Component 711 then improves the estimate of the co-ordinates from the signals received from both components 709 and 712, and feeds a final co-ordinates signal to component 713, which then outputs the co-ordinates value to the computer to be controlled.

Preferably, the emitters 11 and 12 are of nominally of the same output intensity and, in a calibration step, the signal processing means compensates for any differences in the output intensities of the emitters 11 and 12, by adjusting their received intensities to be identical when they are disposed symmetrically with respect to the receiver 2.

The illustrated sensor systems may be enhanced by one or more additional sources and/or one or more additional receivers, in any combination, to achieve position and orientation or movement sensing, possibly with up to six degrees of freedom, and/or with greater accuracy or precision.

The illustrated systems can also be used to determine velocities and accelerations of the body 13 relative to the receiver 2 or vice-versa.

In this specification, the verb "comprise" has its normal dictionary meaning, to denote non-exclusive inclusion. That is, use of the word "comprise" (or any of its derivatives) to include one feature or more, does not exclude the possibility of also including further features.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A sensor of relative position and orientation, comprising:
    a. first and second emitters which are mutually spaced by a predetermined distance and are arranged respectively to emit first and second electromagnetic radiation in respective first and second directions which have a mutual angular spacing of a predetermined angle; and
    b. a receiver arranged to receive the electromagnetic radiation emitted by both of said emitters and to output:
        i. a first signal dependent upon the total intensity of said first electromagnetic radiation as received by said receiver;
        ii. a second signal dependent upon the total intensity of said second electromagnetic radiation as received by said receiver;
        iii. a third signal dependent upon the direction of said first emitter relative to said receiver; and
        iv. a fourth signal dependent upon the direction of said second emitter relative to said receiver:
    the sensor further comprising:
    c. signal processing means arranged to receive from the receiver said first, second, third and fourth signals and to derive therefrom, utilising a ratio of said first and second signals, an output signal indicating both the position of said emitters relative to said receiver and the orientation of said emitters relative to said receiver.

2. A sensor according to claim 1, wherein said predetermined angle is other than 0°.

3. A sensor according to claim 1, wherein said electromagnetic radiation is infra-red radiation.

4. A sensor according to claim 1, wherein said receiver comprises a lens, an optical bandpass filter, an aperture and a detector.

5. A sensor according to claim 1, wherein said receiver comprises a photoquadrant detector.

6. A sensor according to claim 1, wherein said emitters are mounted on a headset.

7. A sensor according to claim 1, wherein said receiver is mounted on a headset.

8. A sensor according to claim 1, wherein said predetermined distance is a fixed predetermined distance.

9. A sensor according to claim 1, wherein said predetermined distance is capable of limited variation.

10. A sensor according to claim 1, wherein said receiver is fixed relative to world co-ordinates and said emitters are free to move.

11. A sensor according to claim 1, wherein said emitters are fixed relative to world co-ordinates and said receiver is free to move.

12. A sensor according to claim 1, wherein each of said emitters is arranged to emit its respective said electromagnetic radiation in such a pattern that contours of constant ratio of respective total intensities of said radiation at said receiver are orthogonal or near-orthogonal to contours of constant angular separation of said emitters subtended at said receiver.

13. A sensor according to claim 1, wherein each of said emitters is arranged to emit its respective said electromagnetic radiation in such a pattern that ratios of respective total intensities of said radiation at said receiver are substantially dependent upon the yaw of an imaginary line passing close to the optical centers of said emitters relative to said receiver.

14. A sensor according to claim 1, wherein each of said emitters is arranged to emit its respective said electromagnetic radiation in such a pattern that ratios of respective total intensities of said radiation at said receiver are substantially independent of the distance between said emitters and said receiver.

15. A sensor according to claim 1, wherein each of said emitters is arranged to emit its respective said electromagnetic radiation in such a pattern that ratios of respective total intensities of said radiation at said receiver are substantially independent of the rotation of said emitters about an imaginary line passing close to the optical centers of said emitters relative to said receiver.

16. A sensor according to claim 1, wherein the radiation patterns of said emitters are oriented in different directions relative to each other.

17. A sensor according to claim 1, wherein said position of said emitters, or position of a body to which said emitters are attached, relative to said receiver and said orientation of said emitters or body relative to said receiver is determinable in respect of one or more or all of the following: lateral translation, longitudinal translation, yaw, pitch and roll.

18. A sensor according to claim 1, wherein said position of said emitters, or position of a body to which said emitters are attached, relative to said receiver and said orientation of said emitters or body relative to said receiver is determinable in respect of one or more or all of the following: lateral translation, vertical translation, longitudinal translation, yaw and pitch.

19. A sensor according to claim 1, wherein said position of said emitters, or position of a body to which said emitters are attached, relative to aid receiver and said orientation of said emitters or body relative to said receiver is determinable in respect of one or more or all of the following: lateral translation, vertical translation, longitudinal translation, yaw, pitch and a mixture of vertical translation and pitch.

20. A sensor according to claim 1, wherein said first and second electromagnetic radiation is coded by a pseudo-random code, or other near-orthogonal or orthogonal code, to allow independent, or near-independent, reception of said first and second electromagnetic radiation by said receiver.

21. A sensor according to claim 1, wherein said first and second electromagnetic radiation is coded by a code that allows multiple further said emitters to be added to their respective radiations to be independently received by said receiver.

22. A sensor according to claim 1, further comprising one or more additional said emitter and/or one or more additional said receiver, to provide one or more further signal to said signal processing means to derive therefrom said output signal.

23. A sensor according to claim 22, wherein said output signal indicates both position and orientation with up to six degrees of freedom.

24. A sensor according to claim 1, further comprising a computational model of the physical sensor system which is used by said signal processing means for the determination of one or more co-ordinates estimated by said signal processing means from the signals received from said receiver.

25. A sensor according to claim 1, adapted as an input device for a computer, to control operation of the computer.

26. A computer provided with a sensor according to claim 1, arranged as an input device to control operation of the computer.

* * * * *